United States Patent [19]

Marucchi-Soos et al.

[11] Patent Number: 5,916,702
[45] Date of Patent: Jun. 29, 1999

[54] CO TOLERANT PLATINUM-ZINC FUEL CELL ELECTRODE

[75] Inventors: Elise Marucchi-Soos, Warren; John Lawrence Robbins, Stockton; Richard James Bellows, Hampton; David Terence Buckley, Somerville, all of N.J.

[73] Assignee: Exxon Research and Engineering Co., Florham Park, N.J.

[21] Appl. No.: 08/912,275

[22] Filed: Aug. 15, 1997

[51] Int. Cl.$^6$ ...................................................... H01M 4/86
[52] U.S. Cl. ................................ 429/44; 429/40; 204/293; 502/101; 502/185; 252/500; 252/502; 252/503
[58] Field of Search .................................. 429/40, 44, 45, 429/41; 422/94, 98; 204/290 R, 293, 294, 283, 284; 502/101, 185; 252/500, 502, 503

[56] References Cited

U.S. PATENT DOCUMENTS

| | | | |
|---|---|---|---|
| 5,346,871 | 9/1994 | Robbins et al. | 502/61 |
| 5,374,598 | 12/1994 | Stonehart et al. | 502/185 |
| 5,470,673 | 11/1995 | Tseung et al. | 429/44 |

OTHER PUBLICATIONS

Appleby and Foulkes, *The Fuel Cell Handbook,* Chapter 11, "Anodic Electrocatalysis", pp. 313–748. No Date Available.

*Primary Examiner*—Bruce F. Bell
*Attorney, Agent, or Firm*—Linda M. Scuorzo

[57] ABSTRACT

The invention is a composition, comprising: a carbon-supported, dispersed platinum-zinc alloy having the formula $Pt\text{-}Zn_x/C$ wherein x ranges from greater than 0.05 to less than 1 wherein platinum is in the form of platinum particles ranging in size from about 20 Å to about 30 Å on a carbon support, wherein the carbon is in the form of high surface area carbon having surface area ranging from about 100 to about 500 $m^2/g$, and the platinum particles are present in an amount ranging from about 10 to about 40 wt % on the carbon support. The composition is made by the process of depositing on the carbon support a soluble zinc source selected from the group of zinc nitrate, acetate, halides, formates, oxalates, and acetyl acetonates and mixtures thereof; calcining to convert the zinc source to ZnO; and then reducing the zinc oxide at a temperature ranging from about 250° C. to about 600° C., in the presence of hydrogen at a pressure ranging from about 1 atmosphere (100 KPa) to about 10 atmospheres(1000 KPa). or by the process of admixing zinc powder with Pt/C powder; and heating the mixture under a reducing atmosphere at a temperature sufficient to produce the $Pt\text{-}Zn_x/C$ alloy, wherein x ranges from greater than 0.05 to less than 1. The invention has utility in fuel cells in electrochemical processes requiring CO tolerant anodes.

14 Claims, 2 Drawing Sheets

PLATINUM DISTRIBUTION

ABOUT THE NUMBER 5,916,702

CO TOLERANT PLATINUM-ZINC FUEL CELL ELECTRODE

FIELD OF THE INVENTION

The invention is related generally to fuel cells. More specifically, the invention is related to fuel cell electrodes.

BACKGROUND OF THE INVENTION

Fuel cells produce electricity by converting reactants such as hydrogen and oxygen into products such as water. A fuel cell comprises a negative electrode, called a cathode; a positive electrode, called an anode; and an electrolyte situated between the two electrodes. During operation a voltage is produced between the anode and the cathode.

One fuel cell system uses an anode containing platinum, polymer electrolytes, and fuels derived from liquid hydrocarbons. The liquid hydrocarbon fueled fuel cell scheme is a promising power source for electric vehicles because its fuels are readily available, inexpensive, and easily transported. A partial oxidation reaction chemically transforms the hydrocarbons into the desired reactant, hydrogen, and into undesirable carbon monoxide and nitrogen byproducts. The hydrogen ions present at the anode travel across a polymer electrolyte to the cathode. Upon reaching the cathode, the hydrogen ions react with oxygen present at the cathode and electrons from the external circuit to produce water and an external electric current produced by the voltage difference between the anode and cathode.

Increasing the voltage between the anode and cathode is one way of enhancing a fuel cell's performance. Such a voltage increase can be obtained when the fuel cell electrodes are formed from catalytic materials. However, when catalytic poisons such as CO are present in the fuel, the anode to cathode voltage decreases. This in turn undesirably reduces the current flowing in the external circuit.

Hydrogen-oxygen fuel cell having platinum-containing catalytic anodes exhibit a measurable decrease in fuel cell voltage in cases where CO levels exceed about 1 to 5 ppm in the hydrogen fuel. It is believed that this decrease (referred to as an activation overpotential) is caused by the additional electric potential needed at the anode to oxidize the carbon monoxide into carbon dioxide. As electric current is made available to the external circuit, the overpotential increases, and consequently decreases the fuel cell's effectiveness as a generator of electric energy.

Some methods for reducing the effect of CO poisoning of fuel cell electrodes such as the water gas shift reaction and preferential partial oxidation concentrate on processing the hydrogen fuel so as to remove as much CO as possible. However, even when preferential oxidation and water gas shift are used in combination under transient conditions, those processes result in a hydrogen fuel containing excessive CO impurities.

Other methods for reducing the effect of CO impurities on fuel cell voltage use CO-tolerant fuel cell electrodes. The amount of activation overpotential that develops at an electrode in the presence of CO impurities depends on the electrode potential that the anode requires to oxidize the adsorbed carbon monoxide. Changing the composition, electronic structure, and physical structure of the anode material can affect the potential required to oxidize the carbon monoxide.

Both Pt/Ru and Pt/Sn electrodes are known to exhibit CO oxidation activity at potentials lower than those observed with pure platinum electrodes. However, it is believed that electrodes made from these materials cannot tolerate CO concentrations in the hydrogen fuel in excess of about 10 ppm without exhibiting CO activation polarization. This CO tolerance is less than that needed for practical fuel cell use. Further, the observed CO activation polarization results in a 200 to 500 mV reduction in fuel cell voltage in a cell made with electrodes fabricated using these materials, thereby reducing the cell's effectiveness as an electric power generator.

Platinum particles dispersed in non-stoichiometric hydrogen tungsten bronzes also have been used as electrodes for fuel cells (see for example, U.S. Pat. No. 5,470,673).

Consequently there is a continuing need for other CO-tolerant anodes that are capable of oxidizing carbon monoxide at low potentials.

SUMMARY OF THE INVENTION

Figure 1A:
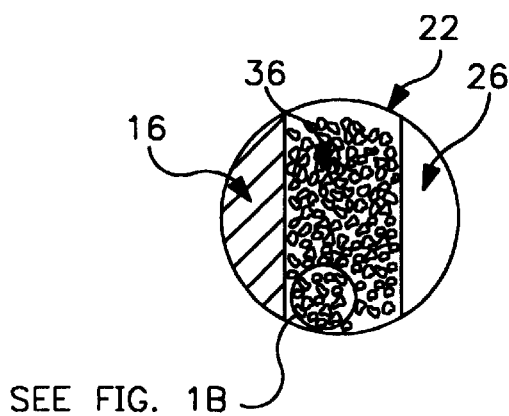
FIG. 1A is a pictorial representation showing a magnified view of Pt/C catalysts between the anode backing layer and the polymer electrolyte membrane of the MEA structure.

The invention is a composition, comprising: a carbon-supported, dispersed platinum-zinc alloy having the formula Pt-$Zn_x$/C wherein x ranges from greater than 0.05 to less than 1 wherein platinum is in the form of platinum particles ranging in size from about 20 Å to about 30 Å on a carbon support, wherein the carbon is in the form of high surface area carbon having surface area ranging from about 100 to about 500 $m^2$/g, and the platinum particles are present in an amount ranging from about 10 to about 40 wt % on the carbon support.

The composition is made by the process of depositing on the carbon support a soluble zinc source selected from the group of zinc nitrate, acetate, halides, formates, oxalates, and acetyl acetonates and mixtures thereof; calcining to convert the zinc source to ZnO; and then reducing the zinc oxide at a temperature ranging from about 250° C. to about 600° C., in the presence of hydrogen at a pressure ranging from about 1 atmosphere (100 KPa) to about 10 atmospheres (1000 KPa). or by the process of admixing zinc powder with Pt/C powder; and heating the mixture under a reducing atmosphere at a temperature sufficient to produce the Pt-$Zn_x$/C alloy, wherein x ranges from greater than 0.05 to less than 1.

The invention has utility in electrochemical processes requiring CO tolerant anodes, particularly fuel cell technology.

The present invention may comprise, consist or consist essentially of the disclosed elements, and includes the products produced by the processes disclosed herein.

DETAILED DESCRIPTION OF THE INVENTION

In one embodiment, the invention is a platinum zinc alloy. The alloy is formed on a carbonaceous support (and referred to herein as Pt-Zn/C or Pt-$Zn_x$/C) wherein x ranges from greater than 0.05 but less than 1, preferably 0.25–1.00 zinc. The composition is formed from highly dispersed, small platinum particles and zinc salts that are thermally decomposable in a reducing environment at process conditions to zinc metal, e.g., nitrates such as zinc nitrate. The invention includes as other embodiments the electrocatalyst and the electrode containing said Pt-$Zn_x$ alloy, a fuel cell having a Pt-$Zn_x$/C electrode as a catalyst capable of oxidizing CO at low potentials. In still another embodiment, the invention is an electric power generator comprising a fuel cell containing the Pt-$Zn_x$/C anode described herein. Another embodiment includes a method of operating a fuel cell by contacting $H_2$ and CO containing fuel source with the Pt-Zn/C anode for a time sufficient to oxidize the CO. Yet another embodiment includes a method for oxidizing CO in a $H_2$ stream in an electrochemical process by contacting it with the Pt-$Zn_x$/C anode.

The platinum zinc metal alloy material is formed using a carbon-supported platinum catalyst. The platinum should be in the form of platinum particles having diameters ranging in size from about 20 Å to about 30 Å, and be highly dispersed on the carbon support. Carbon supported platinum materials are available commercially, for example 20 wt % Pt on carbon (Vulcan XC-72) catalyst powder produced by E-TEK, Inc. of Natick, Massachusetts. A reducible zinc metal source, preferably a zinc salt, from a solution of an excess thereof is deposited onto or impregnated in the carbon-supported platinum (Pt/C) catalyst, optionally dried. Reduction to zinc metal is carried out in hydrogen at 100 kPa (1 atm) to 1000 kPa (10 atm) and 250° C. to 600° C. Typically, treatment for 1–4 hours is suitable. Zinc salts suitable for deposition include zinc nitrate, acetate, halides, formates, oxalates, acetyl acetonates and other salts convertible to zinc oxide as by calcining and reducing. The calcining and reduction treatment can be accomplished simultaneously or preferably sequentially. The resulting material is a platinum zinc alloy.

Desirably, the atomic ratio of Pt to Zn is greater than 0.05 to less than 1, and the Pt-$Zn_x$ crystallites will be in the size range of from 20 Å to 30 Å or larger.

High CO oxidation activity is a characteristic which enables fuel cell catalysts of the present invention to show enhanced performance when using $H_2$ containing CO impurities as a fuel source.

Oxidation currents at low potentials (0–399 mV/RHE) (RHE means Reversible $H_2$ Electrode) are a measure of CO oxidation activity. Useful CO tolerance requires CO oxidation activity below 100 mV/RHE, preferably below 75 mV.

Unexpectedly, the Pt-$Zn_x$/C electrode shows enhanced stability at potentials above zero mV/RHE in those acidic solutions (e.g., sulfuric acid) as typically would be used, e.g., for liquid electrolytes in fuel cells. By contrast metallic zinc typically begins to corrode above minus 700 mV/RHE.

The resulting composition can be formed into an ink, by combining the Pt-$Zn_x$ alloy with a suitable dispersing agent such as water, isopropyl alcohol or mixtures thereof and a suitable polymeric binder such as perfluorosulfonic acid polymer or mixtures of binders and deposited onto a suitable fuel cell electrode material such as carbon fiber to form the electrocatalyst. The inked electrode is especially suitable for use as an electrode catalyst in fuel cells utilizing hydrogen ($H_2$) feeds containing carbon monoxide (CO) impurities.

Although the electrocatalysts and electrodes described herein can be used in suitable liquid electrolytes in a fuel cell typically a polymer electrolyte will be used. Polymer electrolytes are desirable because solid electrolytes cannot leak as is the case with liquid electrolytes. Pt-$Zn_x$/C electrocatalyst can exhibit a decrease in CO oxidation performance at higher temperatures after prolonged cycling at higher potentials, e.g., above about 300 mV/RHE when an aqeous electrolyte is used.

While not wishing to be bound by any theory or model, this performance loss may result from the loss of Zn from the catalyst, possibly by dissolution into the bulk electrolyte.

The present invention suitably may be carried out in an electrochemical process wherein a CO-containing $H_2$ fuel stream is contacted with an anode to oxidize CO in the stream by using as the anode the Pt-$Zn_x$/C alloy described herein. Similarly, present invention is useful as a method for operating a fuel cell by contacting the fuel source with the Pt-$Zn_x$/C anode described herein for a time and at conditions sufficient to oxidize the CO.

EXAMPLES

Example 1

Preparation of Pt/C

Platinum particles ranging in size from about 20 Å to about 30 Å are dispersed onto a carbon support, e.g., Vulcan XC-72 containing 20 wt % Pt on carbon.

Example 2

Preparation of Pt-$Zn_x$/C electrocatalyst

Pt/C catalyst was impregnated with an amount of an aqueous $Zn(NO_3)_2$ solution using the incipient wetness technique sufficient to produce a Zn/Pt ratio ranging from about 0.1 to about 3.0 atom/atom.

The zinc nitrate impregnated Pt/C was dried at 110° C. for ½ hour and calcined in air or heated under inert gas at 400° C.

The zinc nitrate impregnated Pt/C was reduced in hydrogen at a temperature of 575° C., pressure of 100 kPa for 1½ hours.

Example 3

Preparation of Pt-Zn/C eletrocatalyst

Pt/C powder and zinc metal powder were admixed and heated at 575° C. with under non-oxidizing atmosphere.

Example 4

Preparation of Pt-$Zn_x$/C ink and electrode.

Inks were prepared by combining 0.15 gm of the Pt/C catalyst powder with an aqueous 20 wt % Teflon dispersion diluted 60% perfluorosulfonic acid polymer (PTFE), purchased from ElectroChem, Woburn, Mass., 1 ml of water and 1 ml of isopropanol. The mixture was subjected to ultrasonic shearing forces for ½ hour or until a thick homogeneous mixture was formed.

The ink was then painted onto a carbon fiber cloth and dried. Typical Pt loadings were about 2 mg Pt/$cm^2$. The superficial painted area was approximately 1 $cm^2$.

The following illustrates the properties of the Pt-$Zn_x$/C compositions and the use of those compositions in fuel cells.

Figure 1:
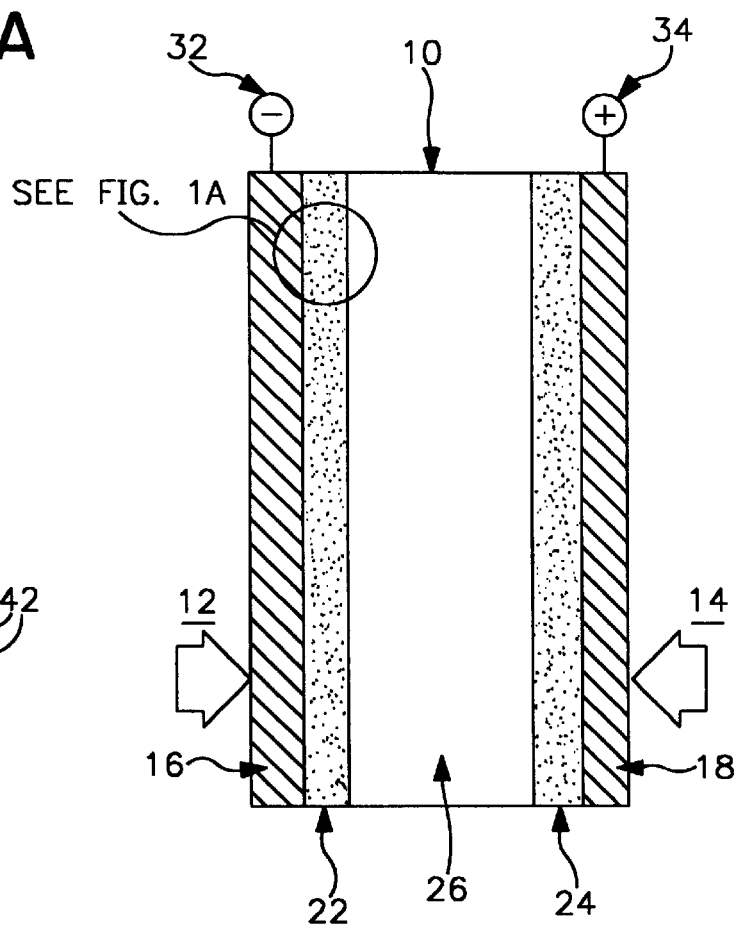
FIG. 1 is a schematic cross-section of a fuel cell showing a membrane electrode assembly (MEA) structure in accordance with one embodiment of the present invention.
Figure 1B:
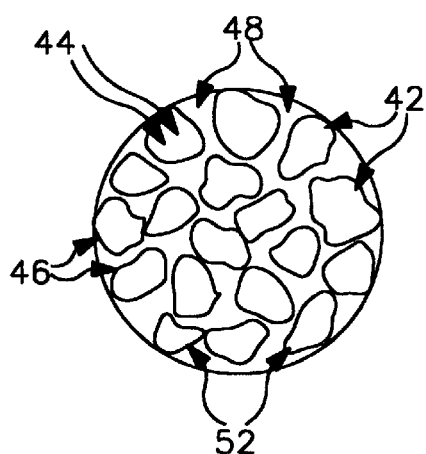
FIG. 1B is an illustration of a magnified view of a portion of FIG. 1A.

FIGS. 1, 1A and 1B show in pictorial cross section form a fuel cell having an electrode structure according to the present invention. Fuel cell assembly 10 includes gaseous reactants which include a fuel source 12 and an oxidizer source 14. The gases 12, 14 diffuse through anode backing layer 16 and cathode backing layer 18, respectively, to porous catalytic electrodes forming anode 22 and cathode 24. Anode 22 is separated from cathode 24 by a solid polymer electrolytic (SPE) membrane 26. SPE membrane 26 provides for ion transport from gas reactions arising in anode 22 and cathode 24. Anode connection 32 and cathode connection 34 are used to interconnect with an external circuit or with other fuel cell assemblies.

FIG. 1A is a magnified view of anode 22 of FIG. 1. Porous catalytic gas diffusion electrode 36 is supported on cathode backing layer 16 and in contact with solid polymer electrolytic membrane 26. A gaseous reactant diffuses through backing layer 16 and into porous catalytic electrode 36. Referring now to FIG. 1B, a further magnified view of a porous catalytic gas diffusion electrode in accordance with one embodiment of the present invention is presented. Porous support particles 42 are provided for catalyst materials 44 which are preferably dispersed on the surface of porous support particles 42. Support particles 42 define interstitial pores 48 which enable gases to penetrate within the electrode structure for electrochemical reactions to occur adjacent to catalyst 44.

Additional particles 52 may be provided to control the wetting properties of the electrode and to help maintain porosity and strength. More particularly, Teflon® (E. I. dupont) may be included to provide hydrophobicity and gas access with the electrode.

In the present invention proton conducting material 46 is provided within the structure of porous gas diffusion electrode 36. Material 46 may be partially impregnated into the pores of support particles 42. Proton conductor 46 enables protons to be conducted between catalytic sites 44 on surfaces defining interstices 48 and SPE membrane 26.

The membrane electrode assembly (MEA) comprises a proton conducting membrane 26 that is covered on each side by both an anode catalyst layer 22 and a cathode catalyst layer 26. Gaseous reactants are fed to each side of this MEA in a fuel cell through anode backing layer 16 and cathode backing layer 18.

FIG. 1B illustrates how platinum is distributed on supports in fuel cell anode catalysts that are known in the art, typically Pt/C or Pt-Ru supported on carbon (designated as Pt-Ru/C). The particles illustrated represent the carbon support material. Platinum or platinum-ruthenium particles, represented by the dark specks 44 are dispersed within the carbon support 42. It is believed that the platinum or Pt-Zn is dispersed on the carbon support in a fashion similar to that of platinum on supports in fuel cell anodes known in the art such as Pt/C or Pt-Ru supported on carbon.

Figure 2:
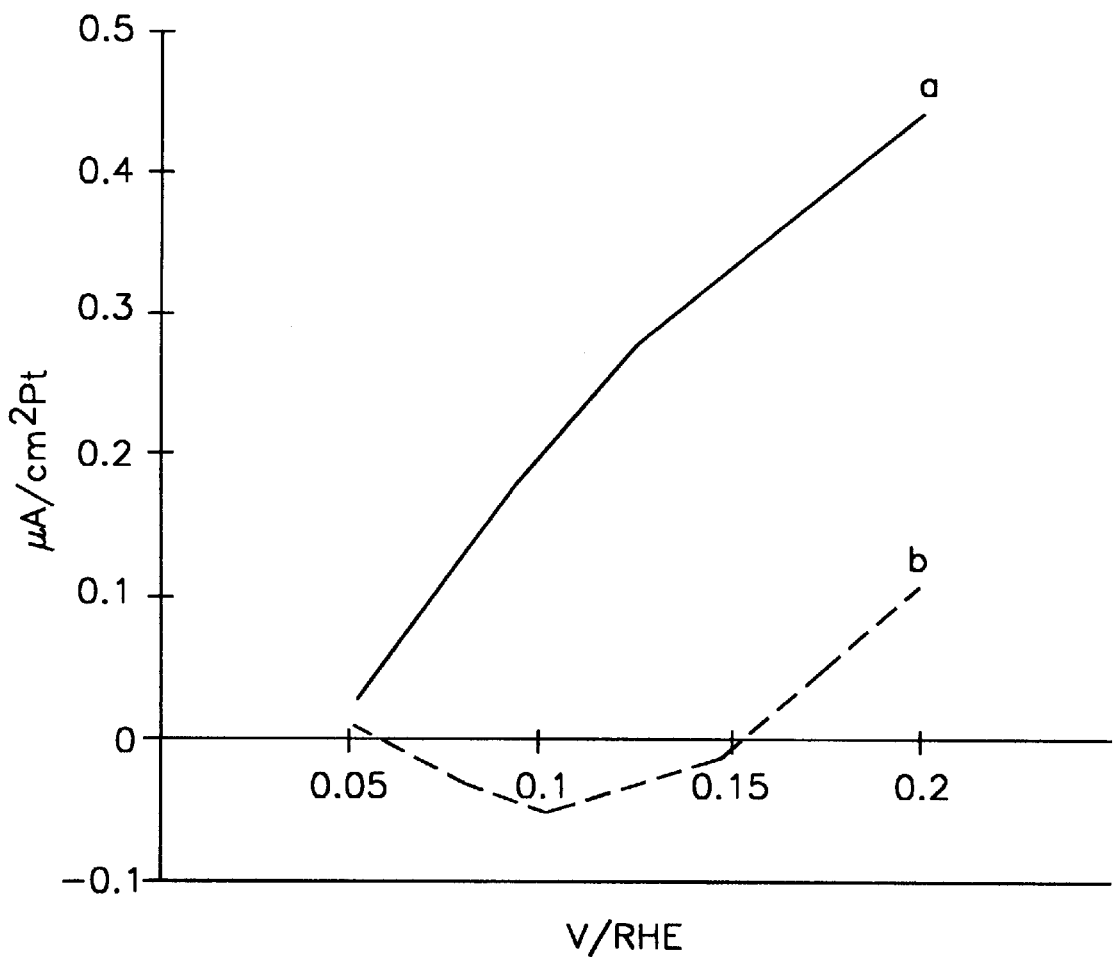
FIG. 2 is a comparison of the CO oxidation activity for Pt-Zn alloys on carbon supported catalyst (designated as Pt-Zn/C) compared with the activity of Pt on carbon supported (designated as Pt/C) catalyst.

FIG. 2 is a comparison of the CO oxidation activity for a Pt-Zn/C catalyst of the present invention prepared according to Example 2. Activity is also compared with the activity of Pt/C catalyst. The CO oxidation currents are expressed per $cm^2$ of surface Pt as estimated from Pt oxide peaks. In these experiments the Pt-Zn/C catalyst and commercial Pt/C catalysts were used to prepare inks. Each electrode prepared according to Example 3 was tested in a three electrode electrochemical cell having 1 N $H_2SO_4$ electrolyte saturated with 1 atmosphere CO at temperatures near 60° C. The reference electrode was a reversible hydrogen electrode (RHE). The CO was pre-absorbed at 50 mV/RHE for about 30 minutes. The Pt-Zn/C electrode began to oxidize CO at a potential of 75–100 mV/RHE while the Pt/C catalyst did not show equivalent CO oxidation until 150–200 mV.

FIG. 2 shows that the Pt-$Zn_x$/C electrode at 62° C. had higher CO oxidation activity than the Pt/C electrode. For the Pt-$Zn_x$/C electrode initial CO oxidation began at potentials of about 50–75 mV and activity increased with higher potentials. Pt/C showed lower CO oxidation activity, with its initial activity beginning between 150–200 mV. Increasing the potential increased the Pt/C activity.

In the preferred embodiment, the invention is an electrode catalyst for use in fuel cells using $H_2$ containing CO impurities as a fuel source. In accordance with the preferred embodiment, platinum-zinc alloys are formed on previously prepared Pt/C catalysts. Fuel cell electrodes are then formed from this material. The preferred electrode is in an MEA of a fuel cell using a polymer electrolyte. Such fuel cells are known in the art in connection with other electrodes.

What is claimed is:

1. An electrode comprising: a carbon-supported, platinum-dispersed zinc alloy having the formula Pt-$Zn_x$/C wherein x ranges from greater than 0.05 to less than 1 wherein the platinum is in the form of platinum particles ranging in size from about 20 Å to about 30 Å on a carbon support, wherein the carbon is in the form of high surface area carbon having surface area ranging from about 100 to about 500 $m^2$/g, and the platinum particles are present in an amount ranging from about 10 to about 40 wt % on the carbon support.

2. The electrode of claim 1 wherein the alloy is produced by the process of:

(a) depositing on the platinum-dispersed carbon support a soluble zinc source selected from the group of zinc nitrate, acetate, halides, formates, oxalates, and acetyl acetonates and mixtures thereof;

(b) calcining to convert the zinc source to ZnO; and then (c) reducing the zinc oxide at a temperature ranging from about 250° C. to about 600° C., in the presence of hydrogen at a pressure ranging from about 1 atmosphere (100 KPa) to about 10 atmospheres (1000 KPa).

3. The electrode of claim 2 wherein the zinc source is zinc nitrate.

4. The electrode of claim 2 wherein steps (b) and (c) occur simultaneously.

5. The electrode of claim 2 wherein step (c) occurs in a fuel cell.

6. The electrode of claim 1 further comprising the step of combining the product of step (b) with a dispersing agent and a polymeric binder to form an ink.

7. The electrode of claim 6 wherein the reducing occurs before formation of the ink.

8. The electrode of claim 6 wherein the reducing occurs after formation of the ink.

9. The electrode of claim 1 reduced in a fuel cell cathode.

10. The electrode of claim 1 produced by the process of:

admixing zinc powder with Pt/C powder;

heating the mixture under a non-oxidizing atmosphere at a temperature sufficient to produce the Pt-$Zn_x$/C alloy, wherein x ranges from greater than 0.05 to less than 1.

11. A fuel cell containing an anode comprising the alloy of claim 1.

12. The electrode of claim 1 wherein the electrode is a fuel cell electrode.

13. In an electrochemical process wherein a CO-containing $H_2$ stream is contacted with an anode, a method for oxidizing CO in said stream, comprising: contacting the CO-containing $H_2$ stream with a Pt-$Zn_x$/C alloy anode, wherein x ranges from 0.05 to 1.0.

14. A fuel cell, comprising: an anode capable of catalytically oxidizing carbon monoxide and a second electrode, wherein the anode contains carbon having a surface area ranging from about 100 to about 500 m²/g and platinum particles thereon ranging in size from about 20 Å to about 30 Å, and present in an amount ranging from about 10 to about 40 wt % on the carbon, and wherein the anode is produced by the process of:

(a) depositing on the platinum-dispersed carbon support a soluble zinc source selected from the group of zinc nitrate, acetate, halides, formates, oxalates, and acetyl acetonates, and mixtures thereof;

(b) oxidizing the product of step (a) to convert the zinc source to ZnO;

(c) reducing the product of step (b) at a temperature ranging from about 250° C. to about 600° C., in the presence of hydrogen at a pressure ranging from about 1 atmosphere (100 kPa) to about 3 atmospheres (300 kPa).

* * * * *